US00RE41522E

(19) United States
(12) Reissued Patent
Kesatoshi

(10) Patent Number: US RE41,522 E
(45) Date of Reissued Patent: *Aug. 17, 2010

(54) METHOD AND APPARATUS FOR SCALING UP AND DOWN A VIDEO IMAGE

(75) Inventor: Takeuchi Kesatoshi, Suwa (JP)

(73) Assignee: Seiko Epson Corporation, Tokyo (JP)

( * ) Notice: This patent is subject to a terminal disclaimer.

(21) Appl. No.: 12/222,127

(22) Filed: Aug. 1, 2008

Related U.S. Patent Documents

Reissue of:
(64) Patent No.: 5,874,937
Issued: Feb. 23, 1999
Appl. No.: 08/729,300
Filed: Oct. 10, 1996

U.S. Applications:

(63) Continuation of application No. 11/905,507, filed on Oct. 1, 2007, now abandoned, which is a continuation of application No. 10/224,477, filed on Sep. 30, 2002.

(30) Foreign Application Priority Data

Oct. 20, 1995 (JP) ..... 07-297578

(51) Int. Cl.
*G06T 17/00* (2006.01)

(52) U.S. Cl. ..... 345/428; 345/3.3
(58) Field of Classification Search ..... 345/3.3, 345/428, 660, 698
See application file for complete search history.

(56) References Cited

U.S. PATENT DOCUMENTS

| | | | |
|---|---|---|---|
| 4,418,343 | A | 11/1983 | Ryan et al. |
| 4,511,965 | A | 4/1985 | Rajaram |
| 4,665,438 | A | 5/1987 | Miron et al. |
| 4,816,913 | A | 3/1989 | Harney et al. |
| 4,858,107 | A | 8/1989 | Fedele |
| 4,862,269 | A | 8/1989 | Sonoda et al. |
| 4,907,086 | A | 3/1990 | Truong |
| 5,031,118 | A | 7/1991 | Morizot |
| 5,225,875 | A | 7/1993 | Shapiro et al. |
| 5,276,436 | A | 1/1994 | Shaw et al. |
| 5,283,561 | A | 2/1994 | Lumelsky et al. |
| 5,293,540 | A | 3/1994 | Trani et al. |
| 5,300,944 | A | 4/1994 | Shapiro et al. |
| 5,387,945 | A | 2/1995 | Takeuchi |
| 5,438,663 | A | 8/1995 | Matsumoto et al. |
| 5,444,497 | A | 8/1995 | Takeuchi |
| 5,469,221 | A | 11/1995 | Takeuchi |
| 5,473,342 | A | 12/1995 | Tse et al. |
| 5,517,612 | A | 5/1996 | Dwin et al. |
| 5,592,194 | A | 1/1997 | Nishikawa |
| 5,657,047 | A | 8/1997 | Tarolli |
| 5,721,565 | A | 2/1998 | Nguyen |
| 5,809,182 | A | 9/1998 | Ward et al. |
| 5,845,015 | A | 12/1998 | Martucci |

FOREIGN PATENT DOCUMENTS

EP 0 502 600 A2 1/1992

(Continued)

OTHER PUBLICATIONS

Complaint for Patent Infringement CV No. CV–02–1159–BR.

(Continued)

*Primary Examiner*—Ricardo L Osorio
(74) *Attorney, Agent, or Firm*—Oliff & Berridge, PLC

(57) ABSTRACT

An input video image having an arbitrary resolution is converted to another video image having a predetermined resolution of a display device to display the video image with the converted resolution. The frequencies of the synchronizing signals of the input video signal are measured, and then a resolution of an input video signal is determined from the measured frequencies of the synchronizing signals. The video image represented by the input video signal is expanded or contracted, so as to make the resolution of the input video signal coincident with a resolution of the display device. A resulting video image with the converted resolution is displayed on the display device.

15 Claims, 12 Drawing Sheets

FOREIGN PATENT DOCUMENTS

| | | |
|---|---|---|
| JP | A 62-146064 | 6/1987 |
| JP | B2 1-48701 | 10/1989 |
| JP | A 01-276331 | 11/1989 |
| JP | A 02-001889 | 1/1990 |
| JP | B2 2-55975 | 11/1990 |
| JP | A 03-112280 | 5/1991 |
| JP | A 03-184184 | 8/1991 |
| JP | A 04-051294 | 2/1992 |
| JP | A 05-014760 | 1/1993 |
| JP | A 05-108046 | 4/1993 |
| JP | A 05-127646 | 5/1993 |
| JP | A 05-127980 | 5/1993 |
| JP | A 05-150219 | 6/1993 |
| JP | A 05-158464 | 6/1993 |
| JP | A 05-219468 | 8/1993 |
| JP | A 06-161415 | 6/1994 |
| JP | A 06-236679 | 8/1994 |
| JP | H 07-005856 | 1/1995 |
| JP | A 07-044151 | 2/1995 |
| JP | A 07-073096 | 3/1995 |
| JP | A 07-087457 | 3/1995 |
| JP | A 07-104706 | 4/1995 |
| JP | A 07-199855 A | 8/1995 |
| JP | A 07-199855 | 8/1995 |
| JP | A 07-225565 | 8/1995 |
| JP | A 07-324773 | 9/1995 |
| JP | A 07-261732 | 10/1995 |
| JP | A 07-295545 | 11/1995 |
| JP | A 08-129356 | 5/1996 |
| WO | WO 95/08132 | 3/1995 |

OTHER PUBLICATIONS

Answer of Defendants PLUS Vision Corporation and Defendant PLUS Vision Corporation of America.

Videographics Report, Beginning at p. 2, Article, Video Scan Converter Offers RS–232 Control, RGB Spectrum, California, Jul. 1992.

"Summary of Invalidity Contentions of PLUS Vision Corporation and PLUS Vision Corporation of America relating to U.S. Pat. No. 5,874,937".

User's Manual, 7600XGA/7600WS LCD Projection Panel, InFocus® Systems, Inc., 1992, Tualatin, Oregon.

PanelBook User's Guide, Model 525/530/550, InFocus® Systems, Inc., 1994, Tualatin, Oregon.

PowerView ™950 LCD Projection Panel User's Guide, InFocus® Systems, Inc., 1994, Tualatin, Oregon.

The InFocus Systems Communication Edge, InFocus® Systems, Inc., 1995, Wilsonville, Oregon.

Japanese Office Action for Japanese Patent Application No. 1995–297578 mailed Sep. 17, 2002. (w/translation).

Fig. 4

RESOLUTION DETERMINATION TABLE

| RESOLUTIONS (DOTS X LINES) | FREQUENCIES | |
|---|---|---|
| | HORIZONTAL (kHz) | VERTICAL (Hz) |
| 640×400 | 24.8 | 56.4 |
| 640×480 | 37.5 | 72 |
| 640×480 | 31.5 | 60 |
| 800×600 | 48 | 72 |
| 1024×768 | 56.5 | 70 |
| 1600×1200 | 61.6 | 47 |

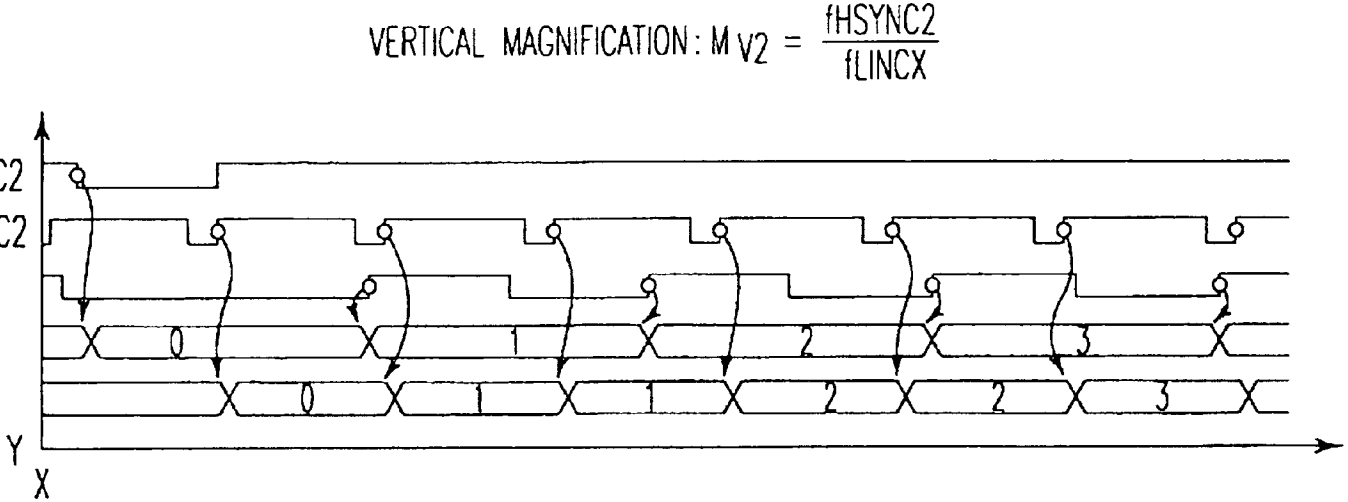
VERTICAL MAGNIFICATION : M V2 = fHSYNC2 / fLINCX
FIG. 7A VSYNC2
FIG. 7B HSYNC2
FIG. 7C LINCX
FIG. 7D HC
FIG. 7E VADD
0
1
2
3
Y
X

Fig. 8A

HORIZONTAL ADDRESSES HADD

VERTICAL ADDRESSES VADD

| | 0 | 1 | 2 | 3 | 4 |
|---|---|---|---|---|---|
| 0 | 12 | 34 | 56 | 78 | 90 |
| 1 | 34 | 56 | 78 | 90 | 12 |
| 2 | 56 | 78 | 90 | 12 | 34 |
| 3 | 78 | 90 | 12 | 34 | 56 |
| 4 | 90 | 12 | 34 | 56 | 78 |

VIDEO DATA IN FRAME MEMORY 34

Fig. 8B

| | 0 | 0 | 1 | 2 | 2 | 3 | 4 | 4 |
|---|---|---|---|---|---|---|---|---|
| 0 | 12 | 12 | 34 | 56 | 56 | 78 | 90 | 90 |
| 1 | 34 | 34 | 56 | 78 | 78 | 90 | 12 | 12 |
| 1 | 34 | 34 | 56 | 78 | 78 | 90 | 12 | 12 |
| 2 | 56 | 56 | 78 | 90 | 90 | 12 | 34 | 34 |
| 2 | 56 | 56 | 78 | 90 | 90 | 12 | 34 | 34 |
| 3 | 78 | 78 | 90 | 12 | 12 | 34 | 56 | 56 |
| 4 | 90 | 90 | 12 | 34 | 34 | 56 | 78 | 78 |
| 4 | 90 | 90 | 12 | 34 | 34 | 56 | 78 | 78 |

EXPANDED VIDEO DATA

HORIZONTAL MAGNIFICATION : $MH2 = \frac{fDCK2}{fDCKX}$

VERTICAL MAGNIFICATION : $MV2 = \frac{fHSYNC2}{fLINCX}$

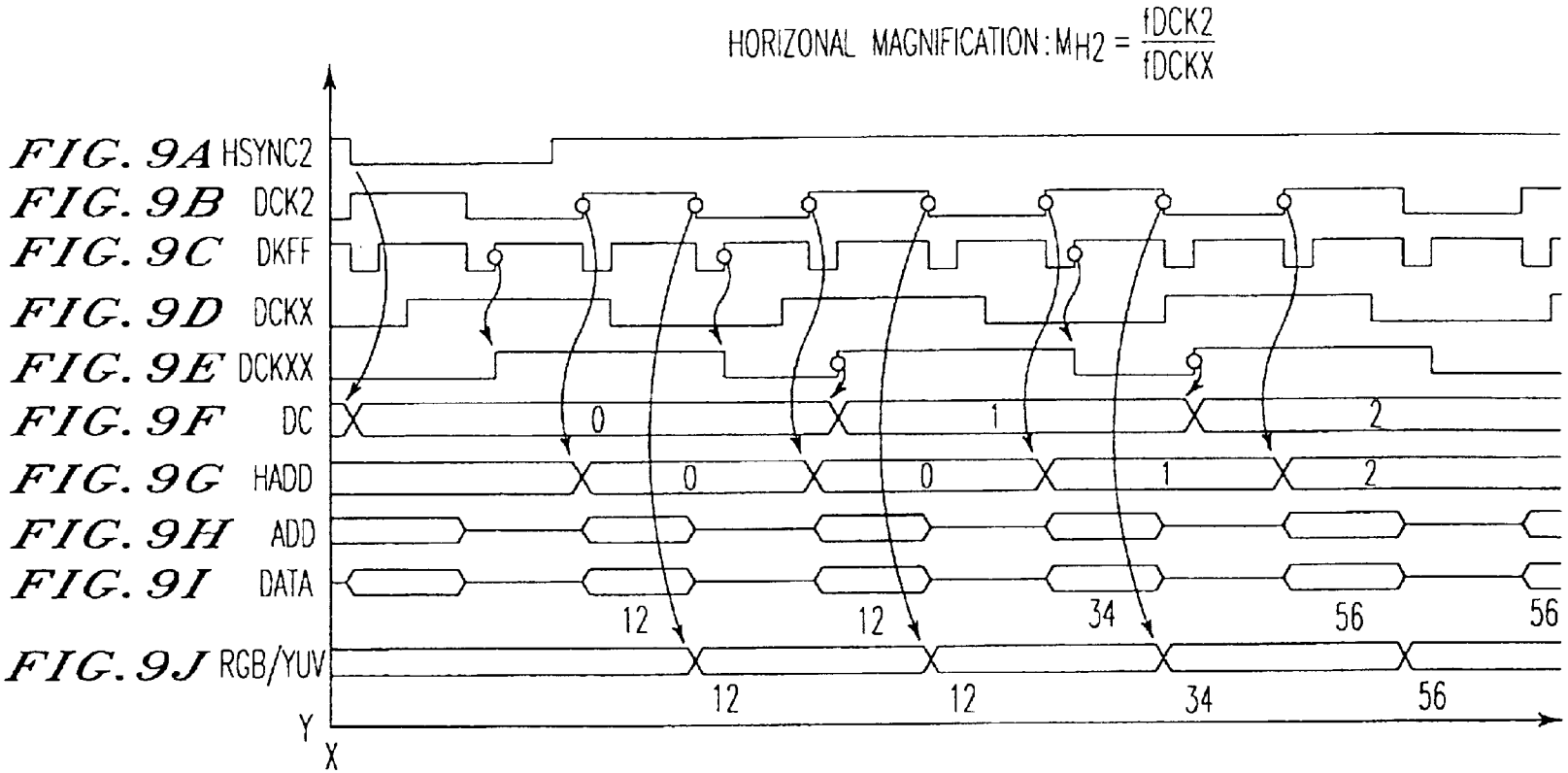
HORIZONAL MAGNIFICATION : MH2 = fDCK2 / fDCKX
FIG. 9A HSYNC2
FIG. 9B DCK2
FIG. 9C DKFF
FIG. 9D DCKX
FIG. 9E DCKXX
FIG. 9F DC
FIG. 9G HADD
FIG. 9H ADD
FIG. 9I DATA
FIG. 9J RGB/YUV
Y
X
0
1
2
12
34
56

Fig. 12A

HORIZONTAL ADDRESS XADD

VIDEO DATA IN FRAME MEMORY 34

VERTICAL ADDRESS YADD

| | 0 | 1 | 2 |
|---|---|---|---|
| 0 | $D_{0,0}$ | $D_{0,1}$ | $D_{0,2}$ |
| 1 | $D_{1,0}$ | $D_{1,1}$ | $D_{1,2}$ |
| 2 | $D_{2,0}$ | $D_{2,1}$ | $D_{2,2}$ |

MEMORY RESOLUTION : $Mx = 3$, $My = 3$

DISPLAY RESOLUTION : $Nx$, $Ny$

HORIZONTAL MAGNIFICATION : $1/Kx = Nx/Mx$

VERTICAL MAGNIFICATION : $1/Ky = Ny/My$

Fig. 12B1

K> 1.0 (CONTRACTION)

| | 0 | 1 |
|---|---|---|
| 0 | $D_{0,0}$ | $D_{0,2}$ |
| 1 | $D_{2,0}$ | $D_{2,2}$ |

Fig. 12B2

K=1.0 (SAME SIZE)

| | 0 | 1 | 2 |
|---|---|---|---|
| 0 | $D_{0,0}$ | $D_{0,1}$ | $D_{0,2}$ |
| 1 | $D_{1,0}$ | $D_{1,1}$ | $D_{1,2}$ |
| 2 | $D_{2,0}$ | $D_{2,1}$ | $D_{2,2}$ |

Fig. 12B3

K<1.0 (EXPANSION)

| | 0 | 1 | 2 | 3 |
|---|---|---|---|---|
| 0 | $D_{0,0}$ | $D_{0,0}$ | $D_{0,1}$ | $D_{0,2}$ |
| 1 | $D_{0,0}$ | $D_{0,0}$ | $D_{0,1}$ | $D_{0,2}$ |
| 2 | $D_{1,0}$ | $D_{1,0}$ | $D_{1,1}$ | $D_{1,2}$ |
| 3 | $D_{2,0}$ | $D_{2,0}$ | $D_{2,1}$ | $D_{2,2}$ |

METHOD AND APPARATUS FOR SCALING UP AND DOWN A VIDEO IMAGE

Matter enclosed in heavy brackets [ ] appears in the original patent but forms no part of this reissue specification; matter printed in italics indicates the additions made by reissue.

*This is one of three reissue applications of U.S. Pat. No. 5,874,937. The first reissue is application Ser. No. 10/224,477 filed Aug. 21, 2002. The second reissue is application Ser. No. 11/905,507, filed Oct. 1, 2007. The third is this application, filed Aug. 1, 2008. This application also is a continuation of Reissue application Ser. No. 11/905,507, which is a continuation of Reissue application Ser. No. 10/224,477.*

BACKGROUND OF THE INVENTION

1. Field of the Invention

The present invention relates to a method of and an apparatus for scaling up and down an input video image and displaying the resultant video image on a display device.

2. Description of the Related Art

In some cases, it is required to display video images generated by a computer on another display device, such as a liquid-crystal projector. In such a case, the computer should generate video signals according to the resolution of the display device. In the description of this specification, the term "resolution" implies both a number of dots (that is, a number of pixels) in a horizontal direction of a video image and a number of lines (that is, a number of scanning lines) in a vertical direction. The number of dots in the horizontal direction is referred to as the horizontal resolution, whereas the number of lines in the vertical direction is referred to as the vertical resolution.

The resolution and the number of tones of a video image generated by a computer are restricted by the capacity of a video RAM (VRAM) in the computer. The number of tones is reduced for a display with a greater resolution (that is, a larger screen size), and increased for a display with a smaller resolution. When the display device has a significantly large screen size, it may be impossible to make the resolution of a video signal generated by the computer coincident with the resolution of the display device. The similar problem arises when a video image generated by a device other than the computer (for example, a television image) is displayed on a display device other than a television receiver.

SUMMARY OF THE INVENTION

Accordingly, an object of the present invention is to convert any resolution of an input video image to a resolution of a display device and display the video image with the converted resolution.

The present invention is directed to a video image scaling apparatus for scaling up or down an input video image and displaying the scaled video image on a display device. The apparatus comprises: resolution determination means for analyzing an input video signal to determine a resolution of the input video signal; and scaling means for expanding or contracting a video image expressed by the input video signal so that the resolution of the video signal is made equal to a resolution of the display device.

Since the resolution of a display device is known, a ratio of the resolution of the input video signal to the resolution of the display device can be obtained if the resolution of the input video signal is determined. Expansion or contraction of a video image by the ratio will make the resolution of a video signal equal to the resolution of the display device.

In a preferred embodiment of the present invention, the resolution determination means comprises: resolution storage means for storing relations between the resolution of the input video signal and frequencies of synchronizing signals of the input video signal; frequency determination means for determining frequencies of the synchronizing signals of the input video signal; and means for reading out a resolution corresponding to the frequencies of the synchronizing signals from the resolution storage means.

When the relations between the resolutions of a video signal and frequencies of synchronizing signals are stored in the resolution storage means, the resolution can be readily determined according to the frequencies of the synchronizing signals.

In accordance with an aspect of the present invention, the apparatus further comprises: means for displaying a sign indicating that a resolution is unknown when the frequencies of the synchronizing signals of the input video image are not stored in the resolution storage means; and resolution setting means for setting a value of the unknown resolution of the input video signal and registering a relation between the resolution and the frequencies of the synchronizing signals of the input video signal in the resolution storage means.

This aspect allows to convert the resolution of an input image signal even if the input video signal has synchronizing signals of unknown frequencies.

The scaling means comprises: a first buffer memory for temporarily storing the input video signal; a frame memory in which a video signal read out of the first buffer memory is written; a second buffer memory for temporarily storing a video signal read out of the frame memory; and memory control means for giving a write address to the frame memory while successively reading out video signals from the first buffer memory to write the video signal read out of the first buffer memory into the frame memory, and for giving a read address to the frame memory to read out the video signal from the frame memory and transfer the video signal to the second buffer memory, and wherein the memory control means comprises: means for expanding or contracting a video image read out of the frame memory by adjusting the read address given to the frame memory.

The present invention is also directed to a method of scaling up or down an input video image and displaying the scaled video image on a display device. The method comprises the steps of: (a) analyzing an input video signal to determine a resolution of the input video signal; and (b) expanding or contracting a video image expressed by the input video signal so that the resolution of the video signal is made equal to a resolution of the display device.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows the contents of a resolution determination table;

FIG. 7 is a timing chart showing a process of generating vertical addresses;

FIGS. 8A and 8B show a concrete procedure of expanding a video image;

FIG. 9 is a timing chart showing a process of generating horizontal addresses;

FIGS. 12A, 12B1, 12B2, and 12B3 show a process of expanding and contracting a video image by multiplying read addresses by a predetermined coefficient K.

DESCRIPTION OF THE PREFERRED EMBODIMENT

Figure 1:
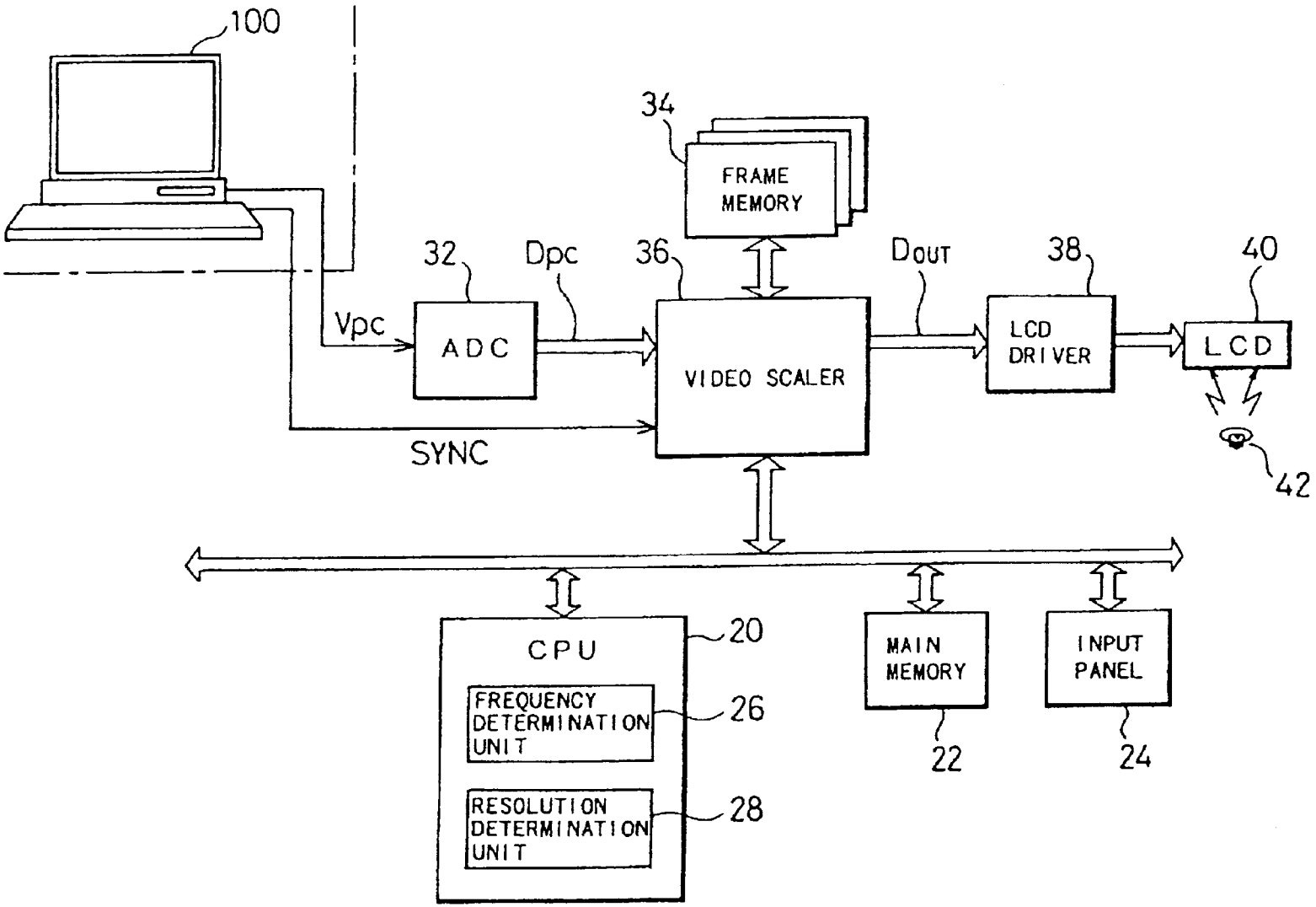
FIG. 1 is a block diagram illustrating the structure of a liquid-crystal projector as a first embodiment according to the present invention.

FIG. 1 is a block diagram illustrating the structure of a liquid-crystal projector as a first embodiment according to the present invention. The liquid-crystal projector projects video images generated by a personal computer 100 on a large-size screen (not shown). The liquid-crystal projector includes a CPU 20, a main memory 22, an input panel 24 functioning as input means, an A-D converter 32, a frame memory 34, a video scaler 36, LCD drivers 38, LCD panels (liquid-crystal panels) 40, and a light source 42. The frame memory 34 includes three memory planes for storing R, G, and B signals, respectively. The LCD drivers 38 and the LCD panels are also provided for the R, G, and B signals.

The CPU 20 functions as a frequency determination unit 26 for determining a frequency of a synchronizing signal SYNC given by the personal computer 100 and as a resolution determination unit 28 for determining a resolution corresponding to the frequency of the synchronizing signal SYNC. The CPU 20 executes computer program codes stored in the main memory 22 to implement these functions.

The A-D converter 32 converts an analog video signal VPC generated by the personal computer 100 to a digital video signal DPC and transmits the digital video signal DPC to the video scaler 36. The video scaler 36 receives the digital video signal DPC as well as the synchronizing signal SYNC output from the personal computer 100. In the description of this specification, the term "video signals" may represent video signals in a narrow sense that do not include synchronizing signals, and also those in a broad sense that include synchronizing signals.

The video scaler 36 writes the input digital video signal DPC into the frame memory 34 while reading out a video signal from the frame memory 34 and supplying the video signal to the LCD driver 38. In the course of writing or reading procedure, the video scaler 36 expands or contracts a video image, so as to make the resolution of the video signal coincident with a standard resolution of the LCD panel 40. The LCD driver 38 reproduces a video images that is transmitted from the video scaler 36 on the LCD panel 40. The video images reproduced on the LCD panels 40 are finally projected as a color image on the screen by means of an optical system including the light source 42.

Figure 2:
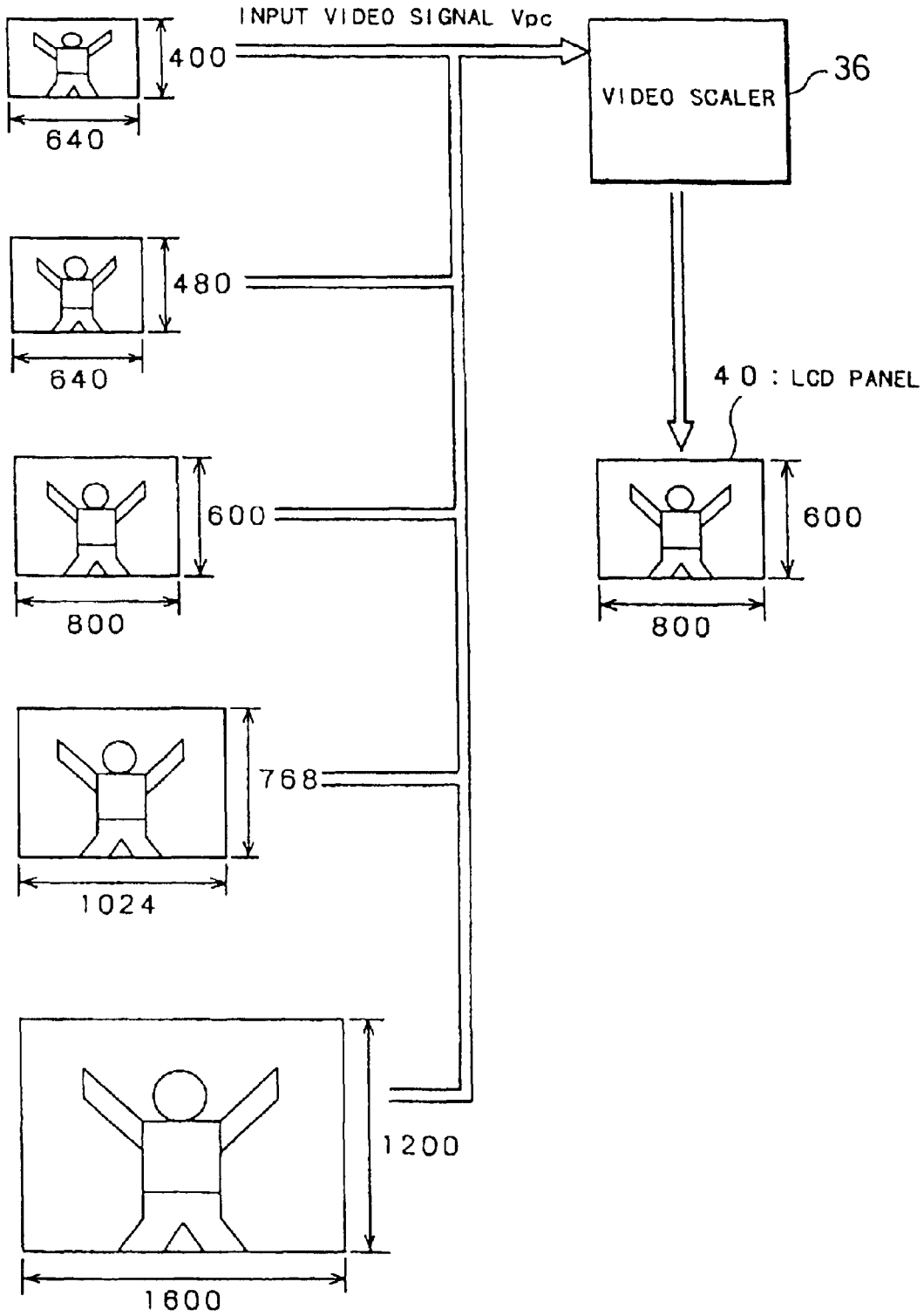
FIG. 2 schematically illustrates functions of a video scaler 36.

FIG. 2 schematically illustrates the functions of the video scaler 36. As shown in the left half of FIG. 2, video images generated by the personal computer 100 may have a variety of resolutions (for example, 640 dots by 400 lines, 640 dots by 480 lines, 800 dots by 600 lines, 1,024 dots by 768 lines, and 1,600 dots by 1,200 lines). The standard resolution of the LCD panel 40 is, on the other hand, fixed to a predetermined value. In the example of FIG. 2, the standard resolution is 800 dots by 600 lines. The video scaler 36 accordingly expands or contracts the input video signal VPC in order to generate a video signal having the standard resolution of the LCD panel 40. When the video signal VPC generated by the personal computer 100 is input into the liquid-crystal projector of this embodiment, a video image expressed by the video signal VPC will be reproduced on the whole screen of the LCD panels 40. This means that the resolution in the liquid-crystal projector is independent of the resolution of the input video signal VPC. Accordingly, a video image originally generated by the personal computer 100 can be reproduced on the LCD panel 40 to cover its whole display area regardless of the resolution and the number of tones of the image which are determined by the personal computer 100.

Figure 3:
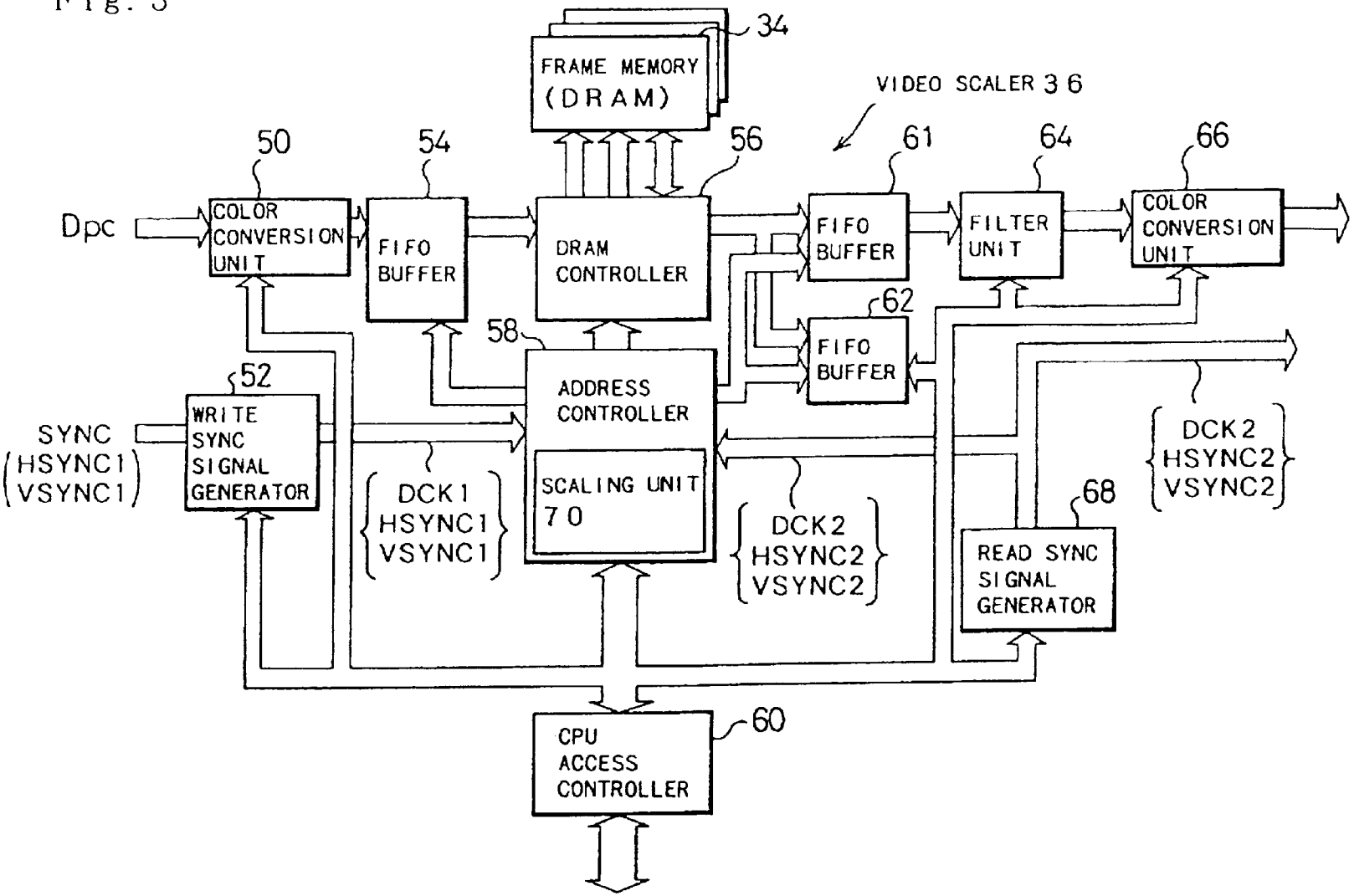
FIG. 3 is a block diagram illustrating the internal structure of the video scaler 36.

FIG. 3 is a block diagram illustrating the internal structure of the video scaler 36. The video scaler 36 includes a first color conversion unit 50, a write synchronizing signal generator 52, an input FIFO buffer 54, a DRAM controller 56, an address controller 58, a CPU access controller 60, two output FIFO buffers 61 and 62, a filter unit 64, a second color conversion unit 66, and a read synchronizing signal generator 68. As shown in FIG. 3, the frame memory 34 is constructed as a dynamic RAM in this embodiment. The DRAM controller 56 is a circuit for controlling a process of writing video signals into the frame memory 34 and a process of reading out video signals from the frame memory 34.

The digital video signal DPC output from the A-D converter 32 shown in FIG. 1 is given to the first color conversion unit 50, which carries out a color conversion to RGB signals, if necessary. By way of example, when the input digital video signal DPC is an YCrCb signal, the first color conversion unit 50 converts the YCrCb signal to an RGB signal.

The synchronizing signal SYNC generated by the personal computer 100 includes a horizontal synchronizing signal HSYNC1 and a vertical synchronizing signal VSYNC1. The write synchronizing signal generator 52 has an internal PLL circuit (not shown), which multiplies the frequency of either the horizontal synchronizing signal HSYNC1 or the vertical synchronizing signal VSYNC1 by $N_0$ to generate a dot clock signal DCK1. The dot clock signal DCK1 indicates an update timing of a dot position in the horizontal direction. The dot clock signal DCK1 as well as the horizontal synchronizing signal HSYNC1 and the vertical synchronizing signal VSYNC1 are supplied to the address controller 58.

The video signal converted by the first color conversion unit 50 is temporarily stored in the FIFO buffer 54 and written into the frame memory 34 by the DRAM controller 56. The FIFO buffer 54 works to adjust the timing of the writing operation. The writing operation into the frame memory 34 is carried out synchronously with the write synchronizing signals (DCK1, HSYNC1, and VSYNC1) output from the write synchronizing signal generator 52. Each dot position (or horizontal address) is updated synchronously with the dot clock signal DCK1, while each scanning line position (vertical address) is updated synchronously with the horizontal synchronizing signal HSYNC1. Each frame or each field is updated synchronously with the vertical synchronizing signal VSYNC1. The DRAM controller 56 also reads out video signals stored in the frame memory 34 and writes the input video signals alternately into the two FIFO buffers 61 and 62. The reading-out operation from the frame memory 34 is carried out synchronously with read synchronizing signals (DCK2, HSYNC2, and VSYNC2) generated by the read synchronizing signal generator 68. The read synchronizing signals (DCK2, HSYNC2, and VSYNC2) are also supplied to the LCD driver 38 to be used as display synchronizing signals for the LCD panel 40. The address controller 58 is a circuit for generating a write address and a read address and supplying the write and read addresses to the DRAM controller 56. The address controller 58 further includes a scaling unit 70 for expanding or contracting (or scaling up or down) a video image.

One line of video signals read out from the frame memory 34 are written alternately into the two output FIFO buffers 61 and 62. In the mean time, video signals are read out from the buffer which is not under the writing operation, to be supplied to the filter unit 64. The filter unit 64 is a circuit for carrying out a variety of filtering processes, such as γ correction (conversion of input/output tones) and left-to-right and top-to-bottom inversions of video images. The filtered video signal undergoes the color conversion in the second color conversion unit 66, if necessary, to be converted to an output video signal DOUT. The output video signal DOUT is then supplied to the LCD driver 38 (see FIG. 1).

The CPU 20 shown in FIG. 1 has access to the respective elements in the video scaler 36 via the CPU access controller 60 shown in FIG. 3. In measuring the frequency of the synchronizing signal SYNC corresponding to the input video signal VPC, the CPU 20 receives the signals output from the write synchronizing signal generator 52 via the CPU access controller 60. The CPU 20 first functions as the frequency determination unit 26 (see FIG. 1) to measure the frequencies of the horizontal synchronizing signal HSYNC1 and the vertical synchronizing signal VSYNC1, which are supplied to the write synchronizing signal generator 52. The CPU 20 then functions as the resolution determination unit 28 to determine the resolution of the input video image VPC based on the measured frequencies.

FIG. 4 shows a resolution determination table indicating relations between the resolutions and the frequencies of the synchronizing signals. The relations between the various resolutions (the number of dots by the number of lines) and the frequencies of the horizontal synchronizing signal and the vertical synchronizing signal are registered in the resolution determination table, which is stored in the main memory 22. The frequency of an operation clock of the CPU 20 is at least tens of MHz while the frequency of the horizontal synchronizing signal is tens of kHz, and the frequency of the vertical synchronizing signal several is tens of Hz. The CPU 20 can thus execute the computer program codes to implement the function of the frequency determination unit 26 to measure these frequencies with a sufficiently high accuracy. In accordance with a concrete procedure, the CPU 20 carries out the counting-up operation at a regular interval and obtains a count between edges (such as falling edges) of the horizontal synchronizing signal HSYNC1. The CPU 20 then calculates the frequency of the horizontal synchronizing signal HSYNC1 from the count. The frequency of the vertical synchronizing signal VSYNC1 can be determined in a similar manner. After determining the frequencies of the synchronizing signals HSYNC1 and VSYNC1, the resolution determination unit 28 determines the corresponding resolution by referring to the resolution determination table (FIG. 4).

As shown in FIG. 4, plural combinations of the frequencies of synchronizing signals may correspond to an identical resolution. It is accordingly desirable to register relations between the resolutions and the frequencies used in a number of commercially available apparatuses as many as possible into the resolution determination table. There is, however, still a possibility of receiving a video signal having a frequency not registered in the resolution determination table. In such a case, the CPU 20 shown in FIG. 1 may make a display on the LCD panel 40 (or on a display unit of the input panel 24), showing that the frequency of the input video signal VPC has not yet been registered. The user then sets the resolution (the number of dots by the number of lines) of the input video signal VPC with the input panel 24, thereby registering the relation between the frequency and the resolution into the resolution determination table. In order to realize this process, it is desirable to store the resolution determination table in a write-enable memory, such as a RAM or a flash memory.

Figures 5A, 5B:
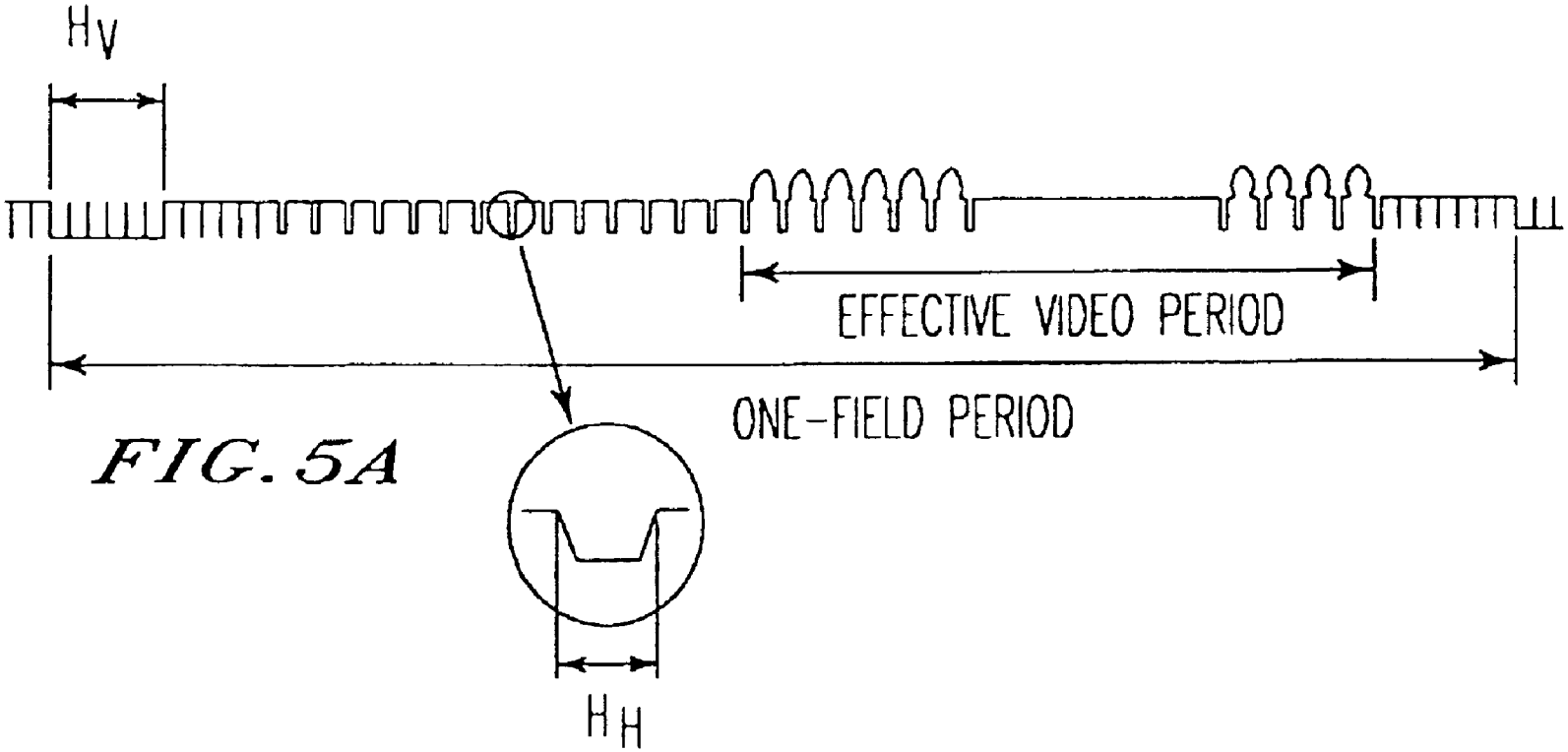
FIG. 5 shows a wave form of a composite video signal.

The resolution of the input video signal VPC may be determined on the basis of not only the frequencies of the horizontal synchronizing signal and the vertical synchronizing signal but on period widths $H_H$ and $H_V$ of the horizontal and vertical synchronizing signals and on the kind of interlacing. FIG. 5 shows the period widths $H_H$ and $H_V$ of the horizontal synchronizing signal and the vertical synchronizing signal. For convenience of illustration, FIG. 5 shows a wave form of a composite video signal. Determination of the resolution of the input video signal based on the frequencies of the synchronizing signals as well as their period widths $H_H$ and $H_V$ and the state of interlacing can effectively reduce the possible errors that may be made in the determination.

The horizontal resolution and the vertical resolution determined by the resolution determination unit 28 are given to the address controller 58 via the CPU access controller 60 (see FIG. 3). The scaling unit 70 in the address controller 58 carries out expansion or contraction of a video image as described before along with FIG. 2, in order to convert the horizontal and vertical resolutions to the standard resolutions of the LCD panel 40.

Figure 6:
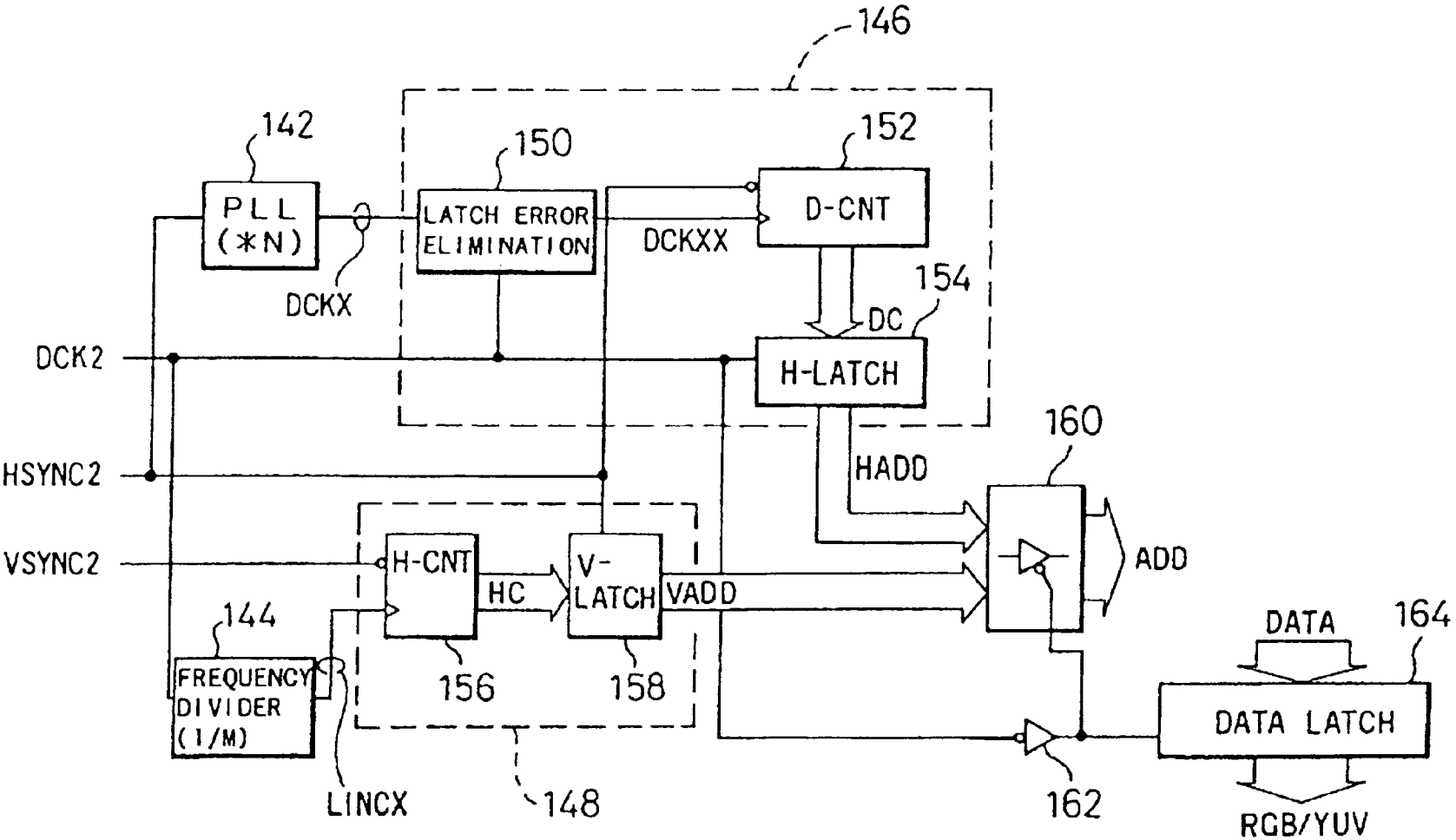
FIG. 6 is a block diagram illustrating the internal structure of a scaling unit 70.

FIG. 6 is a block diagram illustrating the internal structure of the scaling unit 70. The scaling unit 70 includes a PLL circuit 142, a frequency divider 144, a horizontal address generator 146, a vertical address generator 148, a 3-state buffer 160, and an inverter 162. A data latch 164 shown in FIG. 6 is a circuit included in the DRAM controller 56. The horizontal address generator 146 includes a latch error elimination circuit 150, a first counter 152, and a first latch 154. The vertical address generator 148 includes a second counter 156 and a second latch 158.

The PLL circuit 142 receives the horizontal synchronizing signal HSYNC2, which is generated for the reading-out operation, and generates a second dot clock signal DCKX having the frequency of N times the frequency of HSYNC2. The frequency divider 144 receives the dot clock signal DCK2, which is also generated for the reading operation, and divides the frequency of DCK2 by M to generate a line increment signal LINCX. The preset values N and M in the PLL circuit and the frequency divider 144 are used to convert the resolution of the input video signal VPC to the resolution of the LCD panel 40, and are respectively determined by the CPU 20. A concrete process of determining the preset values N and M will be described later.

FIG. 7 is a timing chart showing operation of the vertical address generator 148. After being reset by the vertical synchronizing signal VSYNC2 for the reading operation (FIG. 7(a)), the second counter 156 counts the number of pulses in the line increment signal LINCX. A count HC on the second counter 156 (FIG. 7(d)) is latched at a rising edge of the horizontal synchronizing signal HSYNC2 and given as a vertical address VADD to the 3-state buffer 160. In the example of FIG. 7(e), the vertical address VADD is updated as 0, 1, 1, 2, . . .

FIGS. 8A and 8B show a concrete process of expanding a video image. FIG. 8A shows video data stored in the frame memory 34, and FIG. 8B shows expanded video data. Numerals written in the tables represent the values of video data. In the timing chart of FIG. 7(e), video data are read out from the frame memory 34 such that: a video image on a scanning line of VADD=0 is read out once, a video image on a scanning line of VADD=1 twice, a video image on a scanning line of VADD=2 twice, and the like. The video image thus read out is accordingly expanded in the vertical direction as shown in FIG. 8B. A vertical magnification MV2 is given as a ratio of a frequency fHSYNC2 of the horizontal synchronizing signal HSYNC2 to a frequency fLINCX of the line increment signal LINCX. The video image can be expanded by an arbitrary magnification in the vertical direction by adjusting the preset value M in the frequency divider 144 (FIG. 6). The video image will be contracted in the vertical direction when the value of the magnification MV2 is less than 1.

FIG. 9 is a timing chart showing an operation of the horizontal address generator 146. The latch error elimination circuit 150 (FIG. 6) generates a third dot clock signal DCKXX (FIG. 9(e)) from the first and the second dot clock signals DCK2 and DCKX (FIGS. 9(b) and 9(d)).

Figure 10:
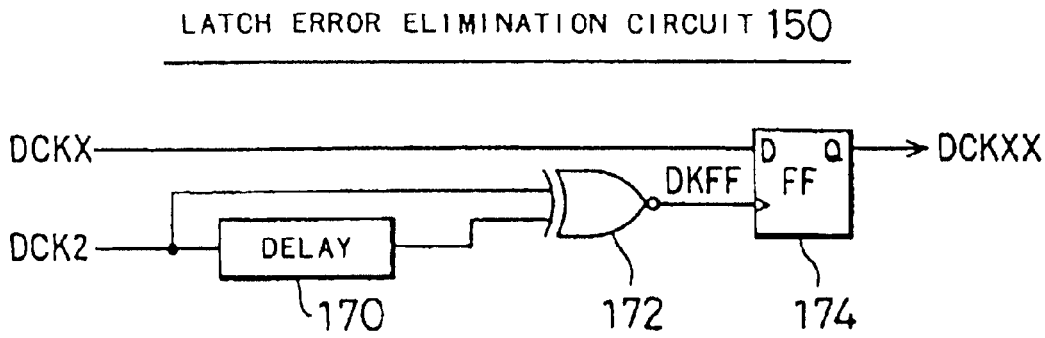
FIG. 10 is a block diagram illustrating the internal structure of a latch error elimination circuit 150.

FIG. 10 is a block diagram illustrating the internal structure of the latch error elimination circuit 150. The latch error elimination circuit 150 includes a delay circuit 170, an exclusive NOR (EXNOR) circuit 172, and a D-type flip-flop 174. An output signal DKFF of the EXNOR circuit 172 is an inversion of an exclusive OR of the first dot clock signal DCK2 and a signal obtained by delaying the dot clock signal DCK2 by a predetermined time period. The signal DKFF thus represents timings of rises and falls of the first dot clock signal DCK2 as shown in FIG. 9(c).

The output signal DKFF of the EXNOR circuit 172 is supplied to a clock input terminal of the flip-flop 174, while the second dot clock signal DCKX is given to a D-input terminal of the flip-flop 174. The third dot clock signal DCKXX output from the flip-flop 174 thus represents the level of the second dot clock signal DCKX at a rising edge of the output signal DKFF of the EXNOR circuit 172 as shown in FIG. 9(e). The third dot clock signal DCKXX has the frequency identical with that of the second dot clock signal DCKX. The output signal DKFF of the EXNOR circuit 172 rises after a predetermined delay time from an edge of the first dot clock signal DCK2, and the timing of the level change of the third dot clock signal DCKXX is delayed by the predetermined delay time from the edge of the first dot clock signal DCK2 accordingly. The latch error elimination circuit 150 generates the third dot clock signal DCKXX, in order to prevent the value of a horizontal address latched by the first latch 154 from being unstable as discussed later in detail.

After being reset by the pulse of the horizontal synchronizing signal HSYNC2, the first counter 152 of the horizontal address generator 146 (FIG. 6) counts up the number of pulses of the third dot clock signal DCKXX generated by the latch error elimination circuit 150 and supplies a count DC (FIG. 9(f)) to the first latch 154. Since the third dot clock signal DCKXX and the second dot clock signal DCKX have identical frequencies as mentioned above, the count DC of the first counter 152 practically indicates the number of pulses of the second dot clock signal DCKX. The first latch 154 latches the count DC synchronously with the first dot clock signal DCK2, and gives the latched count as a horizontal address HADD (FIG. 9(g)) to the 3-state buffer 160. The horizontal address HADD accordingly represents the number of pulses of the second dot clock signal DCKX and is updated at every rising edge of the first dot clock signal DCK2. The value of the horizontal address HADD can be updated in a predetermined manner by adjusting a frequency fDCK2 of the first dot clock signal DCK2 and a frequency fDCKX of the second dot clock signal DCKX. In the example of FIG. 9(g), the value of the horizontal address HADD is varied as 0,0,1, . . .

The tables of FIGS. 8A and 8B discussed above show a process of expanding a video image according to the horizontal address HADD in FIG. 9(g). The timing chart shown in FIG. 9 corresponds to timings of generating addresses in the horizontal direction on an upper-most scanning line having the vertical address of VADD=0. The horizontal address HADD is updated as 0,0,1 . . . as shown in FIG. 9(g). Video data of the respective pixels existing on this scanning line are successively read out from the frame memory 34 o that the video data of the pixel having the horizontal address HADD=0 is read out twice, the video data of the pixel having the horizontal address HADD=1 is read out once, and the like.

As discussed above, the horizontal address HADD depends upon the relation between the frequencies of the two dot clock signals DCK2 and DCKX. A video image can thus be expanded or contracted in the horizontal direction by adjusting the frequencies of these dot clock signals DCK2 and DCKX. A magnification MH2 of a video image in the horizontal direction is given as the ratio of the frequency fDCK2 of the first dot clock signal DCK2 to the frequency fDCKX of the second dot clock signal DCKX as shown in the bottom of FIG. 8. A video image can accordingly be expanded or contracted by an arbitrary magnification in the horizontal direction by adjusting the preset value N in the PLL circuit 142.

The reason why the latch error elimination circuit 150 is used to generate the signal DCKXX is as follows. As shown in FIG. 9(f), the count DC on the first counter 152 is varied synchronously with each rising edge of the third dot clock signal DCKXX (FIG. 9(e)) after the horizontal synchronizing signal HSYNC2 (FIG. 9(a)) is returned to the high level. As discussed previously, an edge of the third dot clock signal DCKXX is delayed by a predetermined time period from an edge of the first dot clock signal DCK2. The latch timing in the first latch 154 thus does not overlap the timing of variation in count DC, so that the value of the horizontal address HADD is made stable.

As discussed above, the magnification MH2 in the horizontal direction and the magnification MV2 in the vertical direction can be set independently as shown in the bottom of FIG. 8, by adjusting the preset value N of the PLL circuit 142 and the preset value M of the frequency divider 144 shown in FIG. 6. A video image can be reproduced on the whole screen of the LCD panel 40 by setting the magnification MH2 in the horizontal direction equal to the ratio of [the horizontal resolution of the LCD panel 40] to [the horizontal resolution of the input video signal VPC] and by setting the magnification MV2 in the vertical direction equal to the ratio of [the vertical resolution of the LCD panel 40] to [the vertical resolution of the input video signal VPC].

Figure 11:
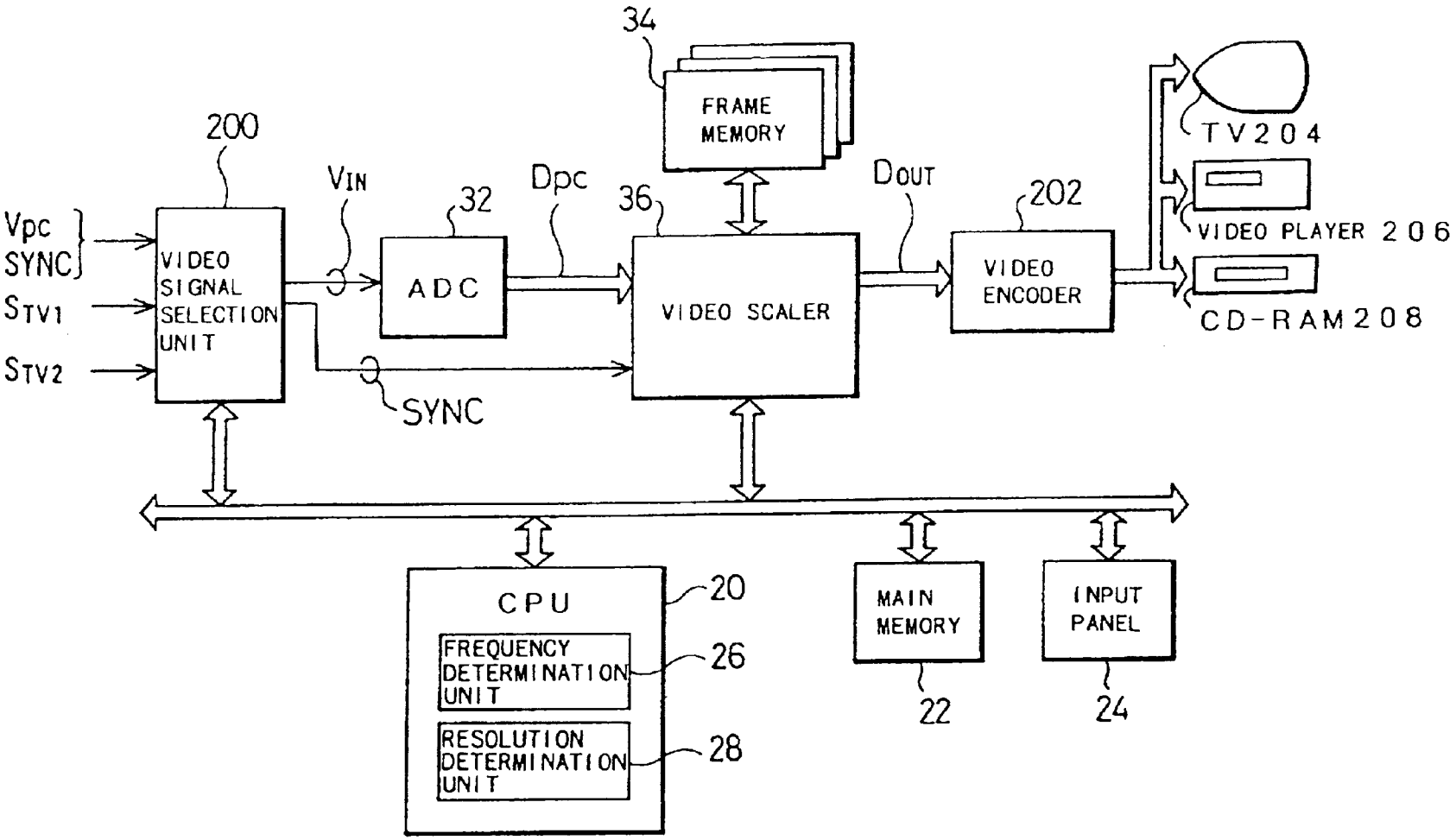
FIG. 11 is a block diagram illustrating the structure of a down converter as a second embodiment according to the present invention.

FIG. 11 is a block diagram illustrating the structure of a down-converter as a second embodiment according to the present invention. The down-converter has a video signal selection unit 200 in addition to the input unit of the liquid-crystal projector shown in FIG. 1. The down-converter further includes a video encoder 202 in place of the LCD driver 38, and a variety of output devices (such as a television receiver 204, a video player 206, and a CD-RAM 208) in place of the LCD panel 40 and the light source 42.

The video signal selection unit 200 receives two television signals STV1 and STV2 as well as video signals (VPC, SYNC) generated by a personal computer, and selects one of the received signals. The television signals STV1 and STV2 are composite video signals including synchronizing signals. When the video signal selection unit 200 selects a composite video signal, a decoder (not shown) in the video signal selection unit 200 generates component video signals VIN and a synchronizing signal SYNC from the selected composite video signal.

The video encoder 202 generates a composite video signals from a digital video signal DOUT and the reading-out synchronizing signals (DCK2, HSYNC2, and VSYNC2) output from the video scaler 36. The composite video signal thus generated is supplied to the television receiver 204 and the video player 206. In order to write a video image into the CD-RAM 208 (write-enable compact disk unit), the video encoder 202 does not generate a composite video signal but directly supplies the digital video signal DOUT and the reading-out synchronizing signals to the CD-RAM 208. The video scaler 36 can change the resolution of a video image to a desired resolution as discussed previously. When the user specifies a desired resolution, the video scaler 36 can output video images with the desired resolution corresponding to the various output devices. The apparatus of FIG. 11 is called down-converter because it can convert a variety of input video signals down to a variety of output video signals.

The present invention is not restricted to the above embodiments or applications. There may be many modifications, changes, and alterations without departing from the scope and spirit of the main characteristics of the inventions follows.

(1) The functions of the frequency determination unit 26 and the resolution determination unit 28 (see FIG. 1) realized by the computer program codes in the above embodiments may be realized by hardware circuits.

(2) In the above embodiments, image expansion and contraction are carried out when video images are read out from the frame memory 34. The image expansion and contraction may, however, be executed when video images are written into the frame memory 34.

(3) Any technique other than the frequency control discussed above may be applied to the image expansion and contraction. For example, they can be attained by multiplying the read address or the write address by a predetermined coefficient to change the addresses so that the image is expanded or contracted according to the changed addresses. FIGS. 12A and 12B1–12B3 show a process of expanding and contracting a video image by multiplying read address by a predetermined coefficient K. FIG. 12A shows a video image stored in the frame memory 34, whereas FIGS. 12B1 through 12B3 show expanded or contracted video images. In the drawing, Di,j represents video data written at an address (i,j) in the frame memory 34.

In the example of FIGS. 12A and 12B1–12B3, it is assumed that a memory resolution is defined by Mx (dots) by My (lines) and a display resolution Nx (dots) by Ny (lines). The coefficients K(Kx,Ky) by which the addresses are multiplied are given as follows:

$$Kx=Mx/Nx \tag{1a}$$

$$Ky=My/Ny \tag{1b}$$

A read address (XADD,YADD) used for reading out video data from the frame memory 34 is converted to a new read address (XADD,YADD) by the following equations:

$$XADD=INT(Kx\times XADD) \tag{2a}$$

$$YADD=INT(Ky\times YADD) \tag{2b}$$

wherein the operator INT( ) represents an operation of taking an integral portion of the value in parentheses.

FIG. 12B1 shows an example of the displayed image when the coefficients Kx and Ky are greater than 1.0 (for example, Kx=Ky=2.0). When the original horizontal address XADD is increased one by one, such as 0,1,2, . . . , the converted horizontal address XADD is varied as 0,2,4, . . . according to Equation (2a) given above. The vertical address YADD is converted in the same manner. Video data are read out from the frame memory 34 according to the converted read addresses XADD and YADD, so that a contracted video image is displayed as shown in FIG. 12B1. The horizontal magnification and the vertical magnification in this contracting process are respectively equal to 1/Kx and 1/Ky.

When the coefficients Kx and Ky are equal to 1.0, a video image in the frame memory 34 is displayed without any expansion or contraction as shown in FIG. 12B2.

FIG. 12B3 shows an example of the displayed image when the coefficients Kx and Ky are smaller than 1.0 (for example, Kx=Ky=0.7). When the original horizontal address XADD is increased one by one as 0,1,2,3, . . . , the converted horizontal address XADD is varied as 0,0,1,2, . . . The vertical address YADD is converted in the same manner. Video data are read out from the frame memory 34 according to the converted read addresses XADD and YADD, so that an expanded video image is displayed as shown in FIG. 12B3.

It is possible to set arbitrary values to Kx and Ky independently.

(4) When a high-speed read/write memory, such as a synchronous DRAM, is used for the frame memory 34, high-speed reading and writing of video signals can be carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

[1. A video image scaling apparatus for receiving a video image output as a video signal in a first format for a first display device and outputting the video image in a second format for a second display device, said apparatus comprising:

frequency determination means for analyzing the video signal to determine a frequency of synchronizing signals when the video signal is output in the first format;

image size determination means for determining an image size of the video signal by analyzing the frequency of the synchronizing signals of the video signal output in the first format; and scaling means for scaling the video image expressed by the video signal in the first format by utilizing the synchronizing signals and the determined image size so that the video signal is output in the second format of said second display device.]

[2. A video image scaling apparatus in accordance with claim 1, wherein said image size determination means comprises:

image size storage means for storing relationships which identify the image size of the video signal in the first format based on the frequency of the synchronizing signals of the video signal; and means for determining the image size of the video signal in the first format by referencing said image size storage means according to the frequency of the synchronizing signals of the video signal.]

[3. A video image scaling apparatus in accordance with claim 2, said apparatus further comprising:

means for displaying a sign indicating that an image size is unknown when the frequencies of the synchronizing signals of the video image are not stored in said image size storage means; and image size setting means for setting a value of the unknown image size of the video signal and registering a relation between the image size and the frequencies of the synchronizing signals of the video signal in said image size storage means.]

[4. A video image scaling apparatus in accordance with claim 1, wherein said scaling means comprises:

a first buffer memory for temporarily storing the input video signal;

a frame memory in which a video signal read out of said first buffer memory is written;

a second buffer memory for temporarily storing a video signal read out of said frame memory; and memory control means for giving a write address to said frame memory while successively reading out video signals from said first buffer memory to write the video signal read out of said first buffer memory into said frame memory, and for giving a read address to said frame memory to read out the video signal from said frame memory and transfer the video signal to said second buffer memory, and wherein said memory control means comprises:

means for expanding or contracting a video image read out of said frame memory by adjusting the read address given to said frame memory.]

[5. A method for receiving a video image output as a video signal in a first format for a first display device and outputting the video image in a second format for a second display device, said method comprising the steps of:

(a) analyzing the video signal to determine a frequency of synchronizing signals when the video signal is output in the first format;

(b) determining an image size of the video signal by analyzing the frequency of the synchronizing signals of the video signal output in the first format; and (c) scaling the video image expressed by the video signal in the first format by utilizing the synchronizing signals and the determined image size so that the video signal is output in the second format of said second display device.]

[6. A method in accordance with claim 5, wherein said step (b) comprises the steps of:

storing, in a memory, relationships which identify the image size of the video signal in the first format based on the frequency of the synchronizing signals of the video signal; and determining the image size of the video signal in the first format by referencing said memory according to the frequency of the synchronizing signals of the video signal.]

[7. A method in accordance with claim 6, further comprising the steps of:

displaying a sign indicating that an image size is unknown when the frequencies of the synchronizing signals of the video image are not stored in said memory; and setting a value of the unknown image size of the video signal and registering a relation between the image size and the frequencies of the synchronizing signals of the video signal in said memory.]

[8. A method in accordance with claim 5, wherein said step (b) comprises the steps of:

writing the input video signal into said frame memory; and giving a read address to said frame memory to read out the video signal from said frame memory while adjusting the read address to expand or contract a video image read out of said frame memory.]

[9. A video image scaling apparatus for receiving a video image output as a video signal in a first format for a first display device and outputting the video image in a second format for a second display device, said apparatus comprising:

a video signal input for receiving a video signal, in the first format, including synchronizing signals;

a synchronizing signal frequency analyzer receiving the video signal from the video signal input and determining a frequency of the synchronizing signals when the video signal is output in the first format;

an image size determination unit for determining an image size of the video signal by analyzing the frequency of the synchronizing signals being applied to the video signal input; and a scaling unit for scaling the video image expressed by the video signal in the first format by utilizing the synchronizing signals and the determined image size so that the video signal is output in the second format of said second display device.]

[10. A video image scaling apparatus in accordance with claim 9, wherein the image size determination unit comprises:

a memory unit for storing relationships which identify the image size of the video signal in the first format based on the frequency of the synchronizing signals of the video signal; and a lookup unit for looking up frequencies in the memory unit to determine the image size of the video signal output in the first format.]

[11. A video image scaling apparatus in accordance with claim 10, further comprising:

an indicator for indicating that an image size is unknown when the frequency of the synchronizing signals are not stored in the memory unit; and a memory unit updating unit for setting in the memory unit (1) a value of the unknown image size of the video signal and (2) a relation between the unknown image size and the frequency of the synchronizing signals.]

[12. A video image scaling apparatus in accordance with claim 9, wherein said scaling unit comprises:

a first buffer memory for temporarily storing the video signal;

a frame memory in which a video signal read out of said first buffer memory is written;

a second buffer memory for temporarily storing a video signal read out of said frame memory; and a memory controller for applying a write address to said frame memory while successively reading out video signals from said first buffer memory to write the video signal read out of said first buffer memory into said frame memory, and for applying a read address to said frame memory to read out the video signal from said frame memory and transfer the video signal to said second buffer memory, and wherein said memory controller includes a read address updating unit which expands or contracts a video image read out of said frame memory by adjusting a read address given to said frame memory.]

*13. A video image scaling apparatus for scaling a video image by receiving a video signal in a first format and outputting a video signal in a second format, the video signal in the second format having a predetermined number of pixels in a scanning line in a horizontal direction and a predetermined number of scanning lines in a vertical direction, the apparatus comprising:*

*a video signal input for receiving the video signal in the first format, including synchronizing signals;*

*a synchronizing signal frequency analyzer receiving the video signal in the first format from the video signal input and determining a frequency of the synchronizing signals;*

*an image size determination unit for determining a number of pixels in a horizontal direction of the video signal in the first format and a number of scanning lines in a vertical direction of the video signal in the first format by analyzing the frequency of the synchronizing signals; and*

*a scaling unit for calculating a horizontal magnification from the number of pixels in the horizontal direction of the video signal in the first format and the number of pixels in the horizontal direction of the video signal in the second format and a vertical magnification from the number of scanning lines in a vertical direction of the video signal in the first format and the number of scanning lines in the vertical direction of the video signal in the second format, and scaling the video image expressed by the video signal in the first format by utilizing at least one of the horizontal magnification and the vertical magnification so that the video signal is output in the second format.*

*14. The video image scaling apparatus according to claim 13, further comprising:*

*a memory to store the video image,*

*wherein the scaling unit performs scaling when the video image is written into the memory.*

*15. The video image scaling apparatus according to claim 13, further comprising:*

*a memory to store the video image,*

*wherein the scaling unit performs scaling when the video image is read out from the memory.*

*16. The video image scaling apparatus according to claim 13, wherein the scaling unit performs scaling in the horizontal and vertical directions.*

*17. The video image scaling apparatus according to claim 13, wherein the scaling unit performs scaling only in the horizontal direction.*

*18. The video image scaling apparatus according to claim 13, wherein the scaling unit performs scaling only in the vertical direction.*

*19. The video image scaling apparatus according to claim 13, wherein the scaling unit performs scaling when the number of pixels in the horizontal direction of the video signal in the first format is larger than the number of pixels in the horizontal direction of the video signal in the second format.*

*20. The video image scaling apparatus according to claim 13, wherein the scaling unit performs scaling when the number of pixels in the horizontal direction of the video signal in the first format is less than the number of pixels in the horizontal direction of the video signal in the second format.*

*21. The video image scaling apparatus according to claim 13, wherein the scaling unit performs scaling when the number of scanning lines in the vertical direction of the video signal in the first format is larger than the number of scanning lines in the vertical direction of the video signal in the second format.*

*22. The video image scaling apparatus according to claim 13, wherein the scaling unit performs scaling when the number of scanning lines in the vertical direction of the video signal in the first format is less than the number of scanning lines in the vertical direction of the video signal in the second format.*

*23. A projector comprising:*

*a light source;*

*a video image scaling apparatus for scaling a video image by receiving a video signal in a first format and outputting a video signal in a second format, the video signal in the second format having a predetermined number of pixels in a scanning line in a horizontal direction and a predetermined number of scanning lines in a vertical direction; and*

*a light modulation panel for modulating light from the light source in response to the video signal in the second format supplied from the video image scaling apparatus,*

*the video image scaling apparatus comprising:*

*a video signal input for receiving the video signal in the first format, including synchronizing signals;*

*a synchronizing signal frequency analyzer receiving the video signal in the first format from the video signal input and determining a frequency of the synchronizing signals;*

*an image size determination unit for determining a number of pixels in a horizontal direction of the video signal in the first format and a number of scanning lines in a vertical direction of the video signal in the first format by analyzing the frequency of the synchronizing signals; and*

*a scaling unit for calculating a horizontal magnification from the number of pixels in the horizontal direction of the video signal in the first format and the number of pixels in the horizontal direction of the video signal in the second format and a vertical magnification from the number of scanning lines in a vertical direction of the video signal in the first format and the number of scanning lines in the vertical direction of the video signal in the second format, and scaling the video image expressed by the video signal in the first format by utilizing at least one of the horizontal magnification and the vertical magnification so that the video signal is output in the second format.*

*24. The projector according to claim 23, further comprising:*

*a memory to store the video image;*

*wherein the scaling unit performs scaling when the video image is written into the memory.*

*25. The projector according to claim 23, further comprising:*

*a memory to store the video image;*

*wherein the scaling unit performs scaling when the video image is read out from the memory.*

*26. The projector according to claim 23, wherein the scaling unit performs scaling in the horizontal and vertical directions.*

*27. The projector according to claim 23, wherein the scaling unit performs scaling only in the horizontal direction.*

* * * * *

UNITED STATES PATENT AND TRADEMARK OFFICE

CERTIFICATE OF CORRECTION

PATENT NO. : RE41,522 E
APPLICATION NO. : 12/222127
DATED : August 17, 2010
INVENTOR(S) : Takeuchi Kesatoshi It is certified that error appears in the above-identified patent and that said Letters Patent is hereby corrected as shown below:

Column 1, line 8 should read as follows:

This is one of four reissue applications of U.S. Patent No. 5,874,937. The first reissue is Application No. 10/224,477 filed August 21, 2002. The second reissue is Application No. 11/905,507, filed October 1, 2007. The third reissue is this application, filed August 1, 2008. The fourth reissue is Application No. 12/801,725, filed June 22, 2010. Reissue Application No. 12/801,725 is a continuation of this application, which is a continuation of Reissue Application No. 11/905,507, which is a continuation of Reissue Application No. 10/224,477.

Signed and Sealed this
Twenty-fourth Day of May, 2011

David J. Kappos

David J. Kappos
*Director of the United States Patent and Trademark Office*